(12) United States Patent
Chen (10) Patent No.: US 7,594,772 B2
(45) Date of Patent: Sep. 29, 2009

(54) KEYBOARD WITH DISTANCE-ADJUSTABLE KEYS

(75) Inventor: Chi-Hung Chen, Taipei (TW)

(73) Assignee: Asustek Computer Inc., Peitou, Taipei (TW)

( * ) Notice: Subject to any disclaimer, the term of this patent is extended or adjusted under 35 U.S.C. 154(b) by 598 days.

(21) Appl. No.: 11/390,520

(22) Filed: Mar. 27, 2006

(65) Prior Publication Data
US 2006/0245807 A1 Nov. 2, 2006

(30) Foreign Application Priority Data
Apr. 29, 2005 (TW) .............................. 94114018 A (51) Int. Cl.
*G06F 3/023* (2006.01)
(52) U.S. Cl. ...................................... 400/489; 400/472
(58) Field of Classification Search .................. 400/489
See application file for complete search history.

(56) References Cited

U.S. PATENT DOCUMENTS

| | | | | |
|---|---|---|---|---|
| 4,430,595 A | * | 2/1984 | Nakasone et al. | 310/339 |
| 5,543,787 A | * | 8/1996 | Karidis et al. | 341/20 |
| 5,615,081 A | * | 3/1997 | Ma | 361/680 |
| 6,092,944 A | * | 7/2000 | Butler | 400/492 |
| 6,563,434 B1 | * | 5/2003 | Olodort et al. | 341/22 |
| 6,629,794 B2 | * | 10/2003 | Cauwels | 400/492 |
| 6,794,588 B2 | * | 9/2004 | Lin | 200/5 A |

FOREIGN PATENT DOCUMENTS

| | | | |
|---|---|---|---|
| CN | 2569231 | | 8/2003 |
| JP | 2001154783 A | * | 6/2001 |
| JP | 2002182818 A | * | 6/2002 |

OTHER PUBLICATIONS

English language translation of abstract of CN 2569231.

* cited by examiner

*Primary Examiner*—Daniel J Colilla
(74) *Attorney, Agent, or Firm*—Thomas, Kayden, Horstemeyer & Risley (57) ABSTRACT

A keyboard with intervals-adjustable keys has a baseboard, plural pairs of key modules, at least one piezoelectric device and a differential mechanism. The plural pairs of key modules are symmetrically arranged on the baseboard between the vertical axis of the baseboard. The piezoelectric devices connected with the plural pair of key modules are used to output electrical signal. The differential mechanism has at least one differential gear and at least one migration controller. When one of these pairs of key modules is forced to move, the pair of key module drives the corresponding migration controller to propel all of the differential gears. Then the other migration controllers and key modules are driven to move.

17 Claims, 8 Drawing Sheets

KEYBOARD WITH DISTANCE-ADJUSTABLE KEYS

RELATED APPLICATIONS

The present application is based on, and claims priority from, Taiwan Application Serial Number 94114018, filed Apr. 29, 2005, the disclosure of which is hereby incorporated by reference herein in its entirety.

FIELD OF THE INVENTION

The present invention relates to a keyboard structure of an electronic product, more particularly to a keyboard with distance-adjustable keys.

BACKGROUND OF THE INVENTION

Currently, the main design trends for an electronic device, such as an electronic product like a notebook, portable TV, cell phone, or PDA, are smallness, portability, and convenience of use.

A keyboard is a prevalent information input device for an electronic product. Several conventional methods of making a keyboard small, portable, and convenient to use have been provided, for example a foldable keyboard. The foldable keyboard may be folded to reduce its lateral length for convenient transport thereof. However, the volume of the foldable keyboard which is folded is not reduced. To the contrary, additional space between the folded portions of the foldable keyboard may be required for storing the foldable keyboard, resulting in increasing the occupying space of the keyboard.

The most popular method of minimizing a keyboard is to reduce the size of the keys and the intervals there between. However, the minimized keys with smaller intervals there between are contrary to the principle of the ergonomics. Such keys more easily tire a user and reduce the effectiveness and accuracy of information input.

SUMMARY OF THE INVENTION

The objective of the present invention is to provide a keyboard with adjustable key intervals to improve the operation performance.

In some embodiments of the present invention, the keyboard with adjustable key intervals comprises a baseboard, a pair of key modules, a plurality of piezoelectric device, and a differential mechanism. The pair of key modules is symmetrically arranged on the baseboard. The piezoelectric devices connected with the key modules. When touched the corresponding key module, the piezoelectric device generates electrical signals. The differential mechanism comprises at least one differential gear and at least one migration controller. Each differential gear has various rotation radii, and may be fastened on the baseboard. The migration controllers migrate in different lateral ranges, respectively, and each is fixed on one pair of the key modules symmetrically and connected with one of the differential gears.

When one of the key modules is forced to depart from each other, the forced key module drives the corresponding migration controller to propel all differential gears, such that the other migration controllers are pushed to drive key modules to depart from each other. Conversely, when one of the key modules is forced to approach each other, the forced key module drives the corresponding migration controller to propel all differential gears. The other migration controllers are pushed to drive to key modules to approach each other.

In addition, each of these the migration controllers may comprise even numbers of symmetric control elements. Each pair of the symmetric control elements has two pairs of symmetric ends. A pair of the symmetric ends adjacent to the vertical axis of the baseboard is fixed on one of these differential gears symmetrically. The other pair of the symmetric ends are fixed on one pair of key modules, symmetrically.

According to the preferred embodiment aforementioned, the features of the present invention are to provide a keyboard having moveable keys. The keys can be moved closer together for convenient transport without minimizing the size thereof, and moved apart to create appropriate intervals therebetween for operation. Therefore, the embodiments of present invention indeed can provide an ergonomic keyboard with transport convenience for reaching the objectives of present invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1b illustrates a vertical view of a keyboard with open key intervals in accordance with a preferred embodiment of the FIG. 1a;

FIG. 2a and FIG. 2b illustrate a perspective view of a keyboard with closed key intervals, in accordance with the first preferred embodiment of present invention;

DETAILED DESCRIPTION OF THE PREFERRED EMBODIMENT

The objective of present invention is to provide a keyboard that provides a user with greater transport convenience and operational comfort.

The aspects, objective, features, and many of the attendant advantages of this invention will become more readily appreciated by reference to the following detailed description.

Figure 1A:
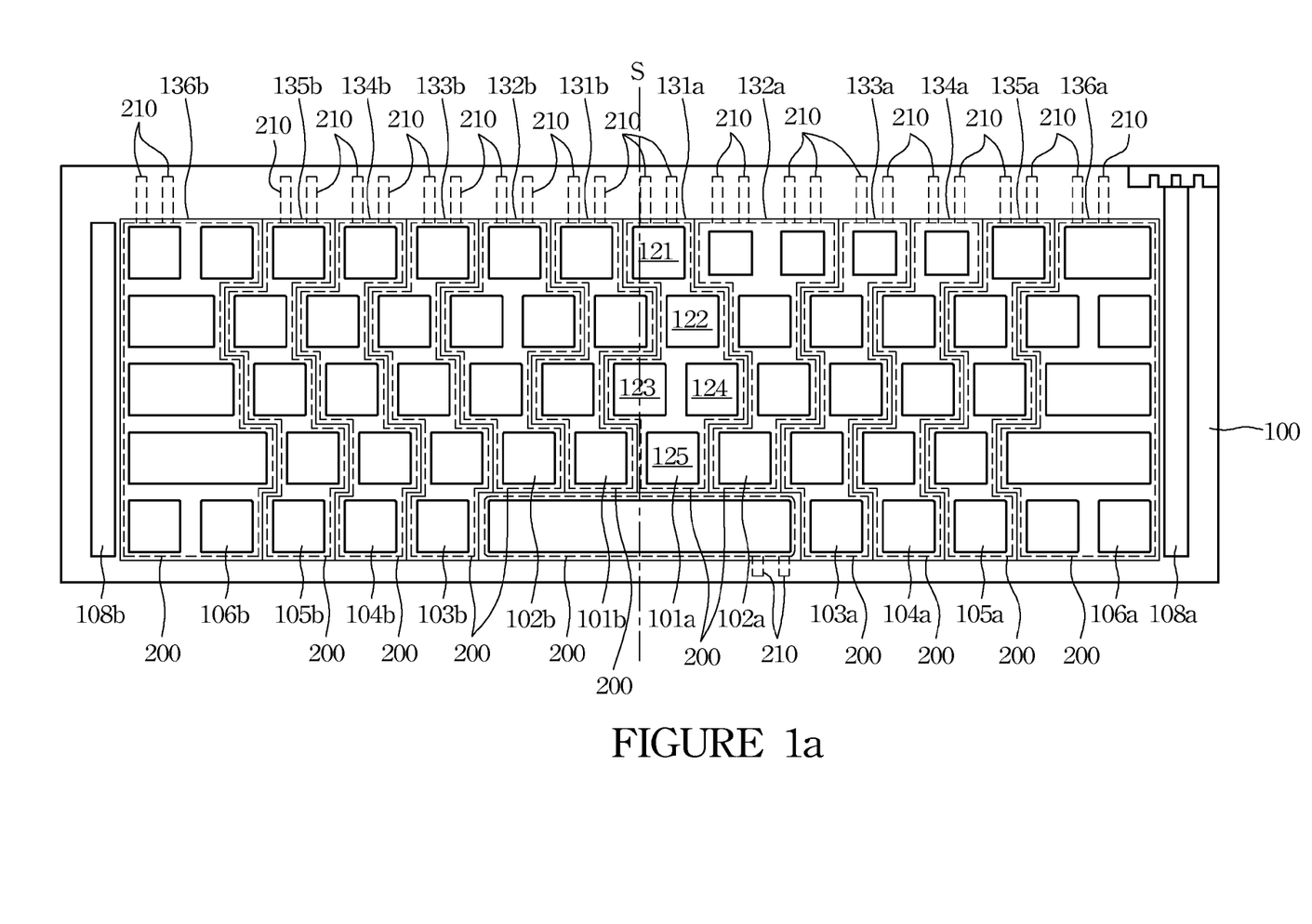
FIG. 1a illustrates a vertical view of a keyboard with closed key intervals in accordance with a preferred embodiment of present invention.
Figure 1B:
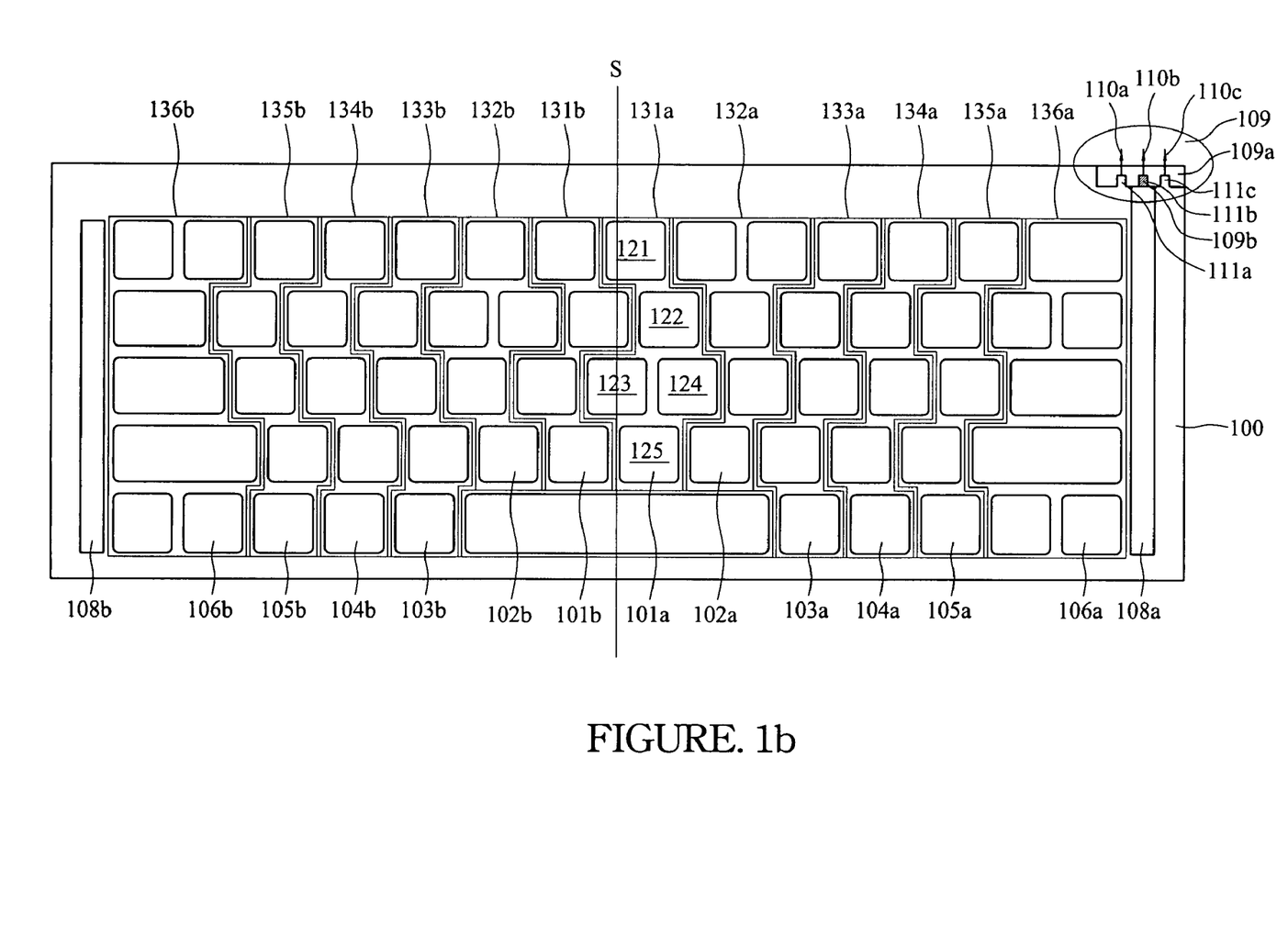

FIG. 1a illustrates a vertical view of a keyboard with closed key intervals in accordance with a preferred embodiment of present invention, while FIG. 1b illustrates a vertical view of a keyboard with separated key intervals in accordance with a preferred embodiment of the FIG. 1a. Referring to FIG. 1a and FIG. 1b, in the preferred embodiment of the present invention, the keyboard with intervals-adjustable keys comprises a baseboard 100, plural pairs of key modules, such as 101a, 101b, 102a, 102b, 103a, 103b, 104a, 104b, 105a, 105b, and 106a, 106b, at least one piezoelectric device, such as 200, and a differential mechanism (not shown).

Each pair of key modules, such as 101a and 101b, is symmetrically arranged on the baseboard between the centerline S of the baseboard 100 and the space key 107. Each of these key modules has at least one key element fixed on a module base. For example, one of the key modules 101a has five key elements, such as 121, 122, 123,124, and 125 fixed on the module base 131a. The module base may be made of a rigid substrate, such as a rigid metal substrate, a rigid nonmetal substrate, or an arbitrary combination thereof.

In the preferred embodiment, the keyboard with intervals-adjustable keys further comprises a pair of frame elements 108a and 108b arranged symmetrically between the centerline S of the baseboard 100 and the space key 107, and located out of the key modules 101a, 101b, 102a, 102b, 103a, 103b, 104a, 104b, 105a, 105b, and 106a, 106b. The pair of frame elements 108a and 108b is used to protect the key modules, or used to apply a force to drive the key modules close to or away from the centerline S of the baseboard 100.

In the preferred embodiment, the keyboard with intervals-adjustable keys further comprises a scale device 109 used to maintain the specific intervals between key modules 101a, 101b, 102a, 102b, 103a, 103b, 104a, 104b, 105a, 105b, and 106a, 106b during operation.

The scale device 109 includes a scale element 109a fixed on the baseboard 100 and a corresponding engaging element 109b configured on the frame element 108a. The scale element 109a has a plurality of predetermined scale marks, such as 110a, 110b, and 110c, and engaging recesses, such as 111a, 111b, and 111c located on the edge of the scale element 109a. The scale marks 110a, 110b, and 110c align with the engaging recesses 111a, 111b, and 111c respectively. The engaging element 109b having a flange protruding from the frame element 108a engages with one of the engaging recesses (such as 111b) to prevent the key modules from moving around during operation.

These piezoelectric devices connected with the key modules generate electrical signals when touched. In the preferred embodiment, these piezoelectric devices comprise flexible printed circuits, such as 210. In some embodiments of the present invention, these piezoelectric devices are made from a single piece of flexible printed circuit. In other embodiments of the present invention, these piezoelectric devices are made of two pieces of flexible printed circuits.

Figure 2A:
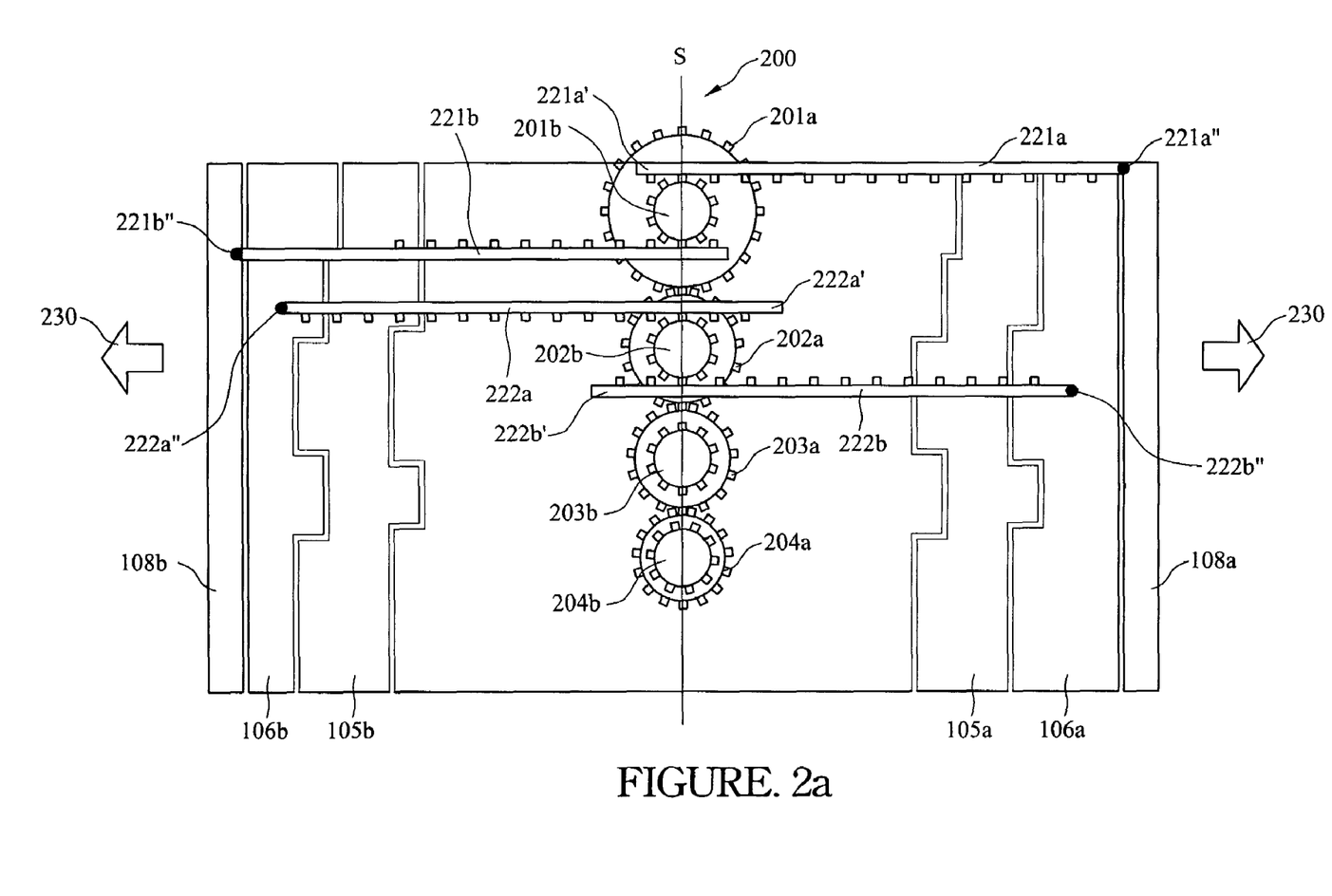
Figure 2B:
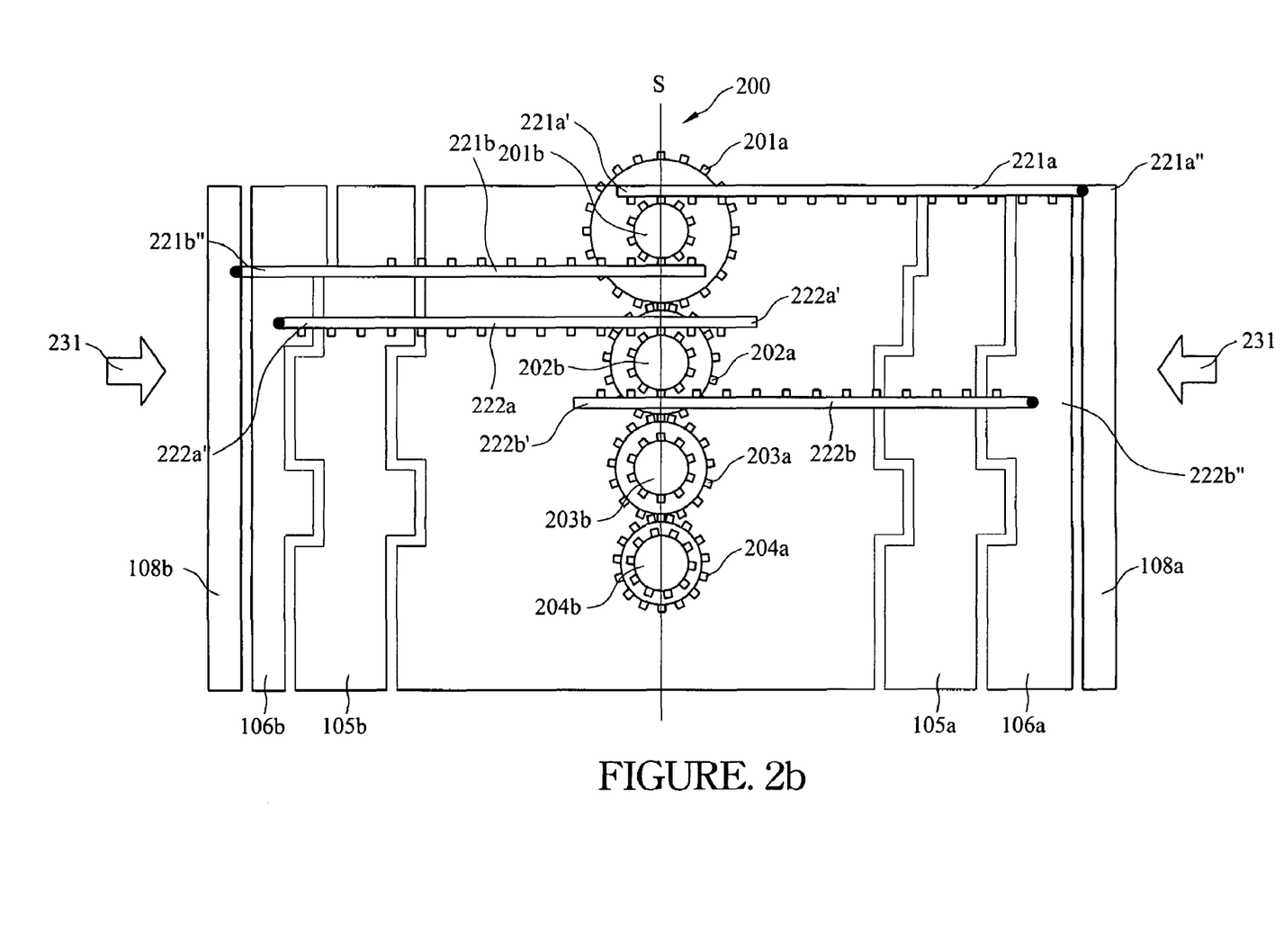
FIG. 2b illustrates the perspective view of a keyboard with open key intervals, in accordance with the first preferred embodiment of present invention.

FIG. 2a illustrates a perspective view of a keyboard with closed key intervals, in accordance with the first preferred embodiment of present invention. FIG. 2b illustrates a perspective view of a keyboard with open key intervals, in accordance with the first preferred embodiment of present invention. Referring to FIG. 2a and FIG. 2b, the differential mechanism 200 comprises a plurality of differential gears and a plurality of corresponding migration controllers. Each of the migration controllers has at least one pair of symmetric control elements, and the differential gears are integrated into a compensating gear train.

Each of the differential gears fixed on the centerline S of the baseboard 100 comprises a differential gearwheel, such as 201a, 202a, 203a, or 204a and a corresponding driver wheel. Each differential gearwheel and corresponding driver wheel connect with each other coaxially, and are driven by each other. In the preferred embodiment of the present invention, the driver wheels are composed of gearwheels 201b, 202b, 203b and 204b.

Each of the differential gearwheels has a rotation radius different from those of the others. For example the differential gearwheels 201a, 202a, 203a, and 204a have different rotation radii, respectively, and are arranged along the centerline of the baseboard in descending rank. In contrast, the driver gearwheels, such as 201b, 202b, 203b, or 204b have the same rotation radius. Since these differential gearwheels 201a, 202a, 203a, or 204a have different rotation radii, the rotating numbers of each of differential gearwheels 201a, 202a, 203a, and 204a vary accordingly. When the driver gearwheels are driven by the differential gearwheels, the driver gearwheels 201b, 202b, 203b, or 204b also have different rotating numbers, respectively.

Each pair of symmetric control elements of the migration controllers has a lateral migration range different from those of the others. In the preferred embodiment of present invention, each pair of the symmetric control elements is a pair of symmetric racks, such as 221a, 221b and 222a, 222b with two pair of symmetric ends.

The symmetric ends of each pair of racks adjacent to the driver gearwheels are fastened symmetrically on one of the driver gearwheels, and the other symmetric ends of the pair of racks departing from the driver gearwheel are fixed respectively on one pair of the key modules 101a, 101b, 102a, 102b, 103a, 103b, 104a, 104b, 105a, 105b, 106a, and 106b, or the pair of frame elements 108a and 108b. For example, the symmetric ends 221a' and 221b' of the pair of racks 221a and 221b adjacent to the driver gearwheels 201b are fastened on the driver gearwheel 201b, and the other symmetric ends 221a" and 221b" of the pair of racks 221a and 221b departing from the driver gearwheel 201b are fixed on the pair of frame elements 108a and 108b, respectively.

The cooperation between the differential mechanism and key modules is described as follows. In the preferred embodiment, the symmetric ends 221a' and 221b' of the longest racks 221a and 221b are engaged symmetrically on the driver gearwheel 201b connecting with the biggest differential gearwheel 201a. The other symmetric ends 221a" and 221b" of the pair of racks 221a and 221b departing from the driver gearwheel 201b are respectively fixed on the pair of frame elements 108a and 108b that have the farthest distance from the centerline S of the baseboard 100. The symmetric ends 222a' and 222b' of the racks 222a and 222b with secondary length are engaged symmetrically on the driver gearwheel 202b connecting with the second largest gearwheel 202a. The other symmetric ends 222a" and 222b" of the pair of racks 222a and 222b departing from the driver gearwheel 202b are respectively fixed on the pair of key module 106a and 106b having the secondary distance from the centerline S of the baseboard 100. The symmetric ends of the shortest racks (not shown) are engaged symmetrically on the driver gearwheel connecting with the smallest differential gearwheel (not shown), and the other symmetric ends of the pair of racks departing from the smallest driver gearwheel are respectively fixed on the nearest pair of key module 101a and 101b from the centerline S of the baseboard 100.

Referring to FIG. 2a again, when one of the key modules or one of the frame elements 108a or 108b is forced to depart from the centerline S of the baseboard 100 (shown as the arrow 230), the forced key module, for example 106a and 106b, drives the corresponding racks 222a and 222b to propel all of the differential gearwheels, such as 201a, 202a, 203a, and 204a and driver gearwheels, such as 201b, 202b, 203b, and 204b, such that the other migration controllers such as rack 221a and 221b, the other key modules 101a, 101b, 102a, 102b, 103a, 103b, 104a, 104b, 105a, 105b, and the pair of frame elements 108a and 108b are driven to depart from the centerline of the baseboard 100.

Referring to FIG. 2b again, when one of the key modules or one of the frame elements 108a or 108b is forced to move close up to the centerline S of the baseboard 100 (shown as the arrow 231), the forced key module, for example 106a and 106b, drives the corresponding racks 222a and 222b to propel all of the differential gearwheels, such as 201a, 202a, 203a, and 204a and driver gearwheels, such as 201b, 202b, 203b, and 204b, such that the other and key modules are driven to move close up to the centerline S of the baseboard 100.

Figure 3A:
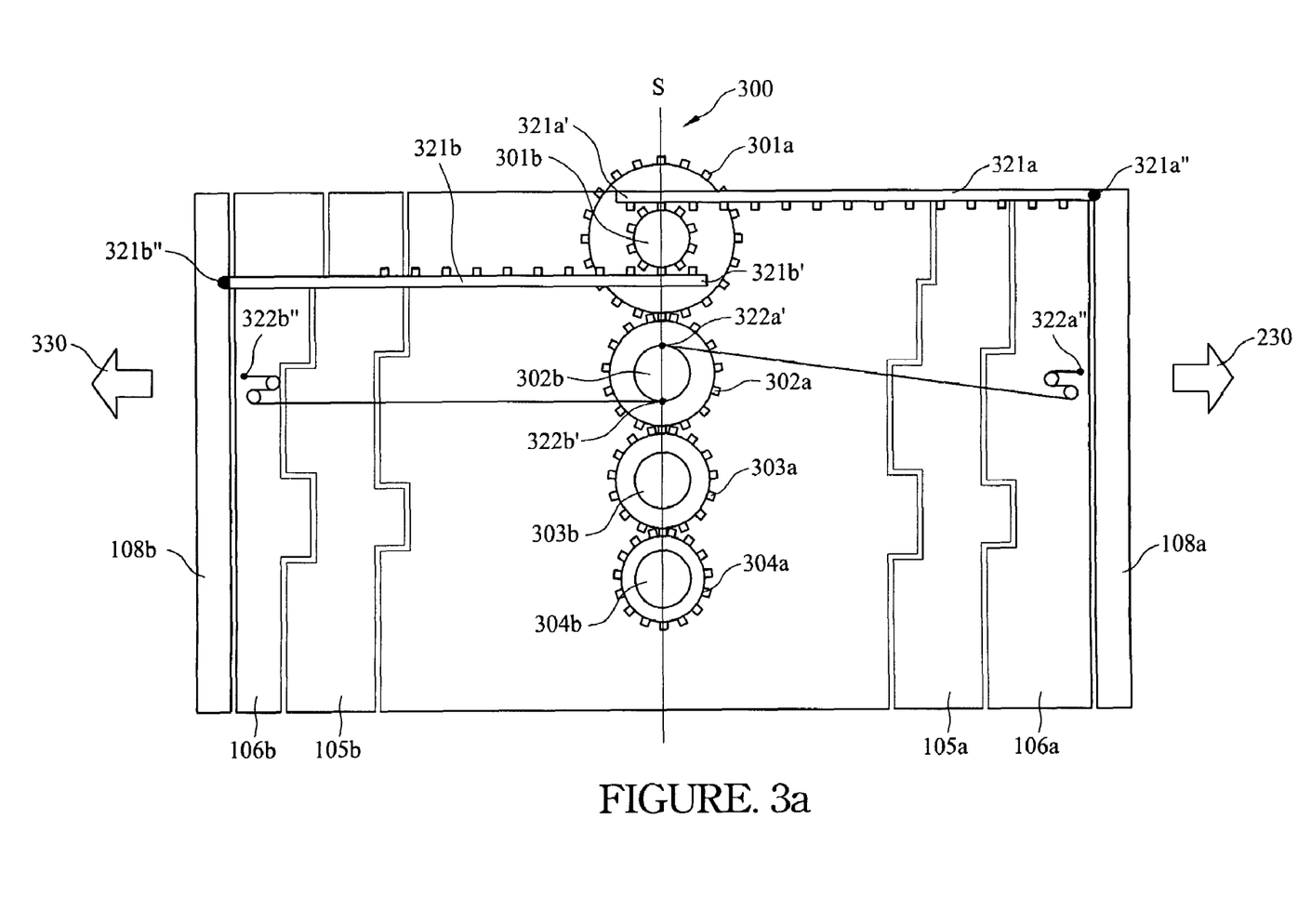
FIG. 3a illustrates the perspective view of a keyboard with closed key intervals, in accordance with the second preferred embodiment of present invention.
Figure 3B:
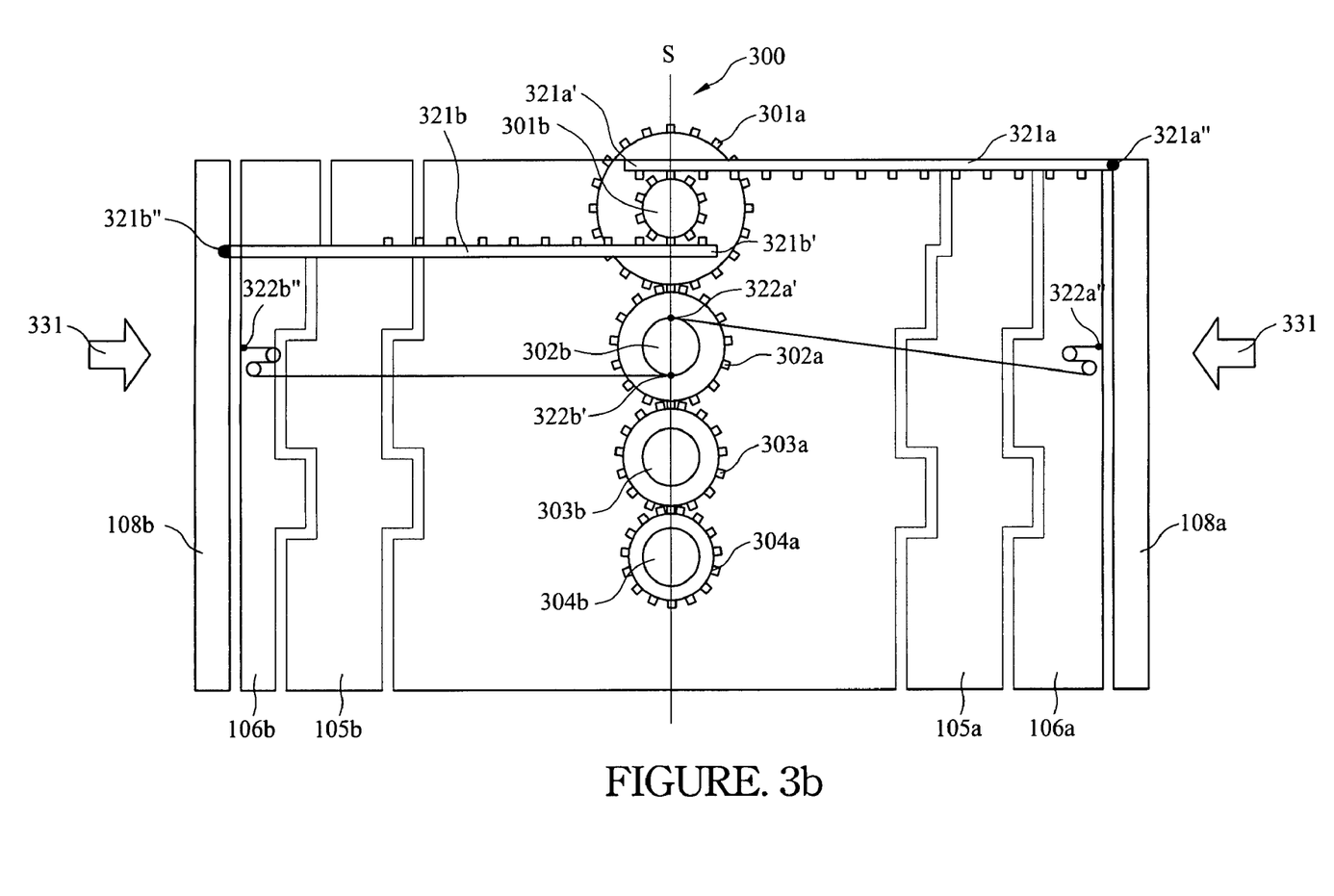
FIG. 3b illustrates the perspective view of a keyboard with open key intervals, in accordance with the second preferred embodiment of present invention.

FIG. 3a illustrates a perspective view of a keyboard with closed key intervals, in accordance with the second preferred embodiment of present invention. FIG. 3b illustrates a perspective view of a keyboard with separated key intervals, in accordance with the second preferred embodiment of present invention. The structures illustrated FIG. 3a and FIG. 3b are similar to the structures illustrated in FIG. 2a and FIG. 2b, but vary in the configurations of the differential mechanism and the migration controller.

Referring to FIG. 3a and FIG. 3b, the differential mechanism 300 comprises a plurality of differential gears and a plurality of corresponding migration controllers. Each of the migration controllers has at least one pair of symmetric control elements, and the differential gears are integrated into a compensating gear train. Each of the differential gears fixed on the centerline S of the baseboard 100 comprises a differential gearwheel, such as 301a, 302a, 303a, or 304a and a corresponding driver wheel. Each of the differential gearwheels and the corresponding driver wheel connect with each other coaxially, and each of the differential gearwheels and the corresponding driver wheel are driven by each other. In the preferred embodiment of the present invention, the driver wheels are composed of a gearwheel 301b, and several driver rollers, such as 302b, 303b and 304b.

Each of the differential gearwheels has a specific rotation radius different from those of the others. For example, the differential gearwheels 301a, 302a, 303a, and 304a have different rotation radii, respectively, and are arranged in descending rank along the centerline S of the baseboard 100. In contrast, the driver wheels, such as gearwheels 301b, the driver rollers 302b, 303b and 304b have the same rotation radius. Since these differential gearwheels 301a, 302a, 303a, or 304a have different rotation radii, the rotating numbers of each of differential gearwheels 301a, 302a, 303a, and 304a vary accordingly. When the driver gearwheels 301b, driver rollers 302b, 303b and 304b are driven by the differential gearwheels, the driver gearwheels 301b, the driver rollers 302b, 303b and 304b also have different rotating numbers, respectively.

Each pair of the symmetric control elements of the migration controllers has a lateral migration range different from those of the others. In the preferred embodiment of present invention, each pair of symmetric control elements is composed of a pair of symmetric racks 321a, 321b and several pairs of symmetric wires, such as 322a, 322b.

Each pair of the symmetric racks and each pair of the symmetric wires both have two pairs of symmetric ends, respectively. The symmetric ends adjacent to the driver wheel are fastened symmetrically on one of the corresponding driver gearwheel or the rollers, and the other symmetric ends departing from the driver wheel are fixed respectively on one pair of the key modules 101a, 101b, 102a, 102b, 103a, 103b, 104a, 104b, 105a, 105b, 106a, and 106b, or the pair of frame elements 108a and 108b. For example the symmetric ends 321a' and 321b' of the pair of racks 321a and 321b are fastened on the driver gearwheel 301b, the other symmetric ends 321a" and 321b" of the pair of racks 321a and 321b departing from the driver gearwheel 301b are fixed on the pair of frame elements 108a and 108b, respectively.

The cooperation between the differential mechanism and key modules is described as follows. In the preferred embodiment, the symmetric ends 321a' and 321b' of the longest racks 321a and 321b are engaged symmetrically on the driver wheel (driver gearwheel 301b) connecting with the biggest differential gearwheel 301a, and the other symmetric ends 321a" and 321b" of the pair of racks 321a and 321b departing from the driver gearwheel 301b are respectively fixed on the pair of frame elements 108a and 108b that have the greatest distance from the centerline S of the baseboard 100. The symmetric ends 322a' and 322b' of the pair of wires 322a and 322b with secondary length are engaged symmetrically on the driver wheel (the driver roller 302b) connecting with the second largest differential gearwheel 302a, and the other symmetric ends 322a" and 322b" of the pair of wires 322a and 322b departing from the driver roller 302b are respectively fixed on the pair of key module 106a and 106b that have the secondary distance from the centerline S of the baseboard 100. The symmetric ends of the shortest pair of wires (not shown) are engaged symmetrically on the driver roller (not shown) connecting with the smallest differential gear, and the other symmetric ends of the pair of wires departing from the smallest driver roller are respectively fixed on the nearest pair of key module 101a and 101b from the centerline S of the baseboard 100.

Referring to FIG. 3a again, when one of the key modules or one of the frame elements 108a or 108b is forced to depart from the centerline S of the baseboard 100 (shown as the arrow 330), the forced key module, for example 106a and 106b, drives the corresponding wires 322a and 322b to propel all of the differential gearwheels 301a, 302a, 303a, and 304a, driver gearwheel 301b, and driver rollers 302b, 303b, and 304b, such that the other migration controllers, rack 321a and 321b and key modules 101a, 101b, 102a, 102b, 103a, 103b, 104a, 104b, 105a, 105b, and the pair of frame elements 108a and 108b are driven to depart from the centerline of the baseboard 100.

Referring to FIG. 3b again, when one of the key modules or one of the frame elements 108a and 108b is forced to move close up to the centerline S of the baseboard 100 (shown as the arrow 331), the forced key module, for example 106a and 106b, drives the corresponding wires 322a and 322b to propel all of the differential gearwheels 301a, 302a, 303a, and 304a, driver gearwheel 301b, and driver rollers 302b, 303b, and 304b, such that the other and key modules are driven to move close up to the centerline S of the baseboard 100.

Figure 4A:
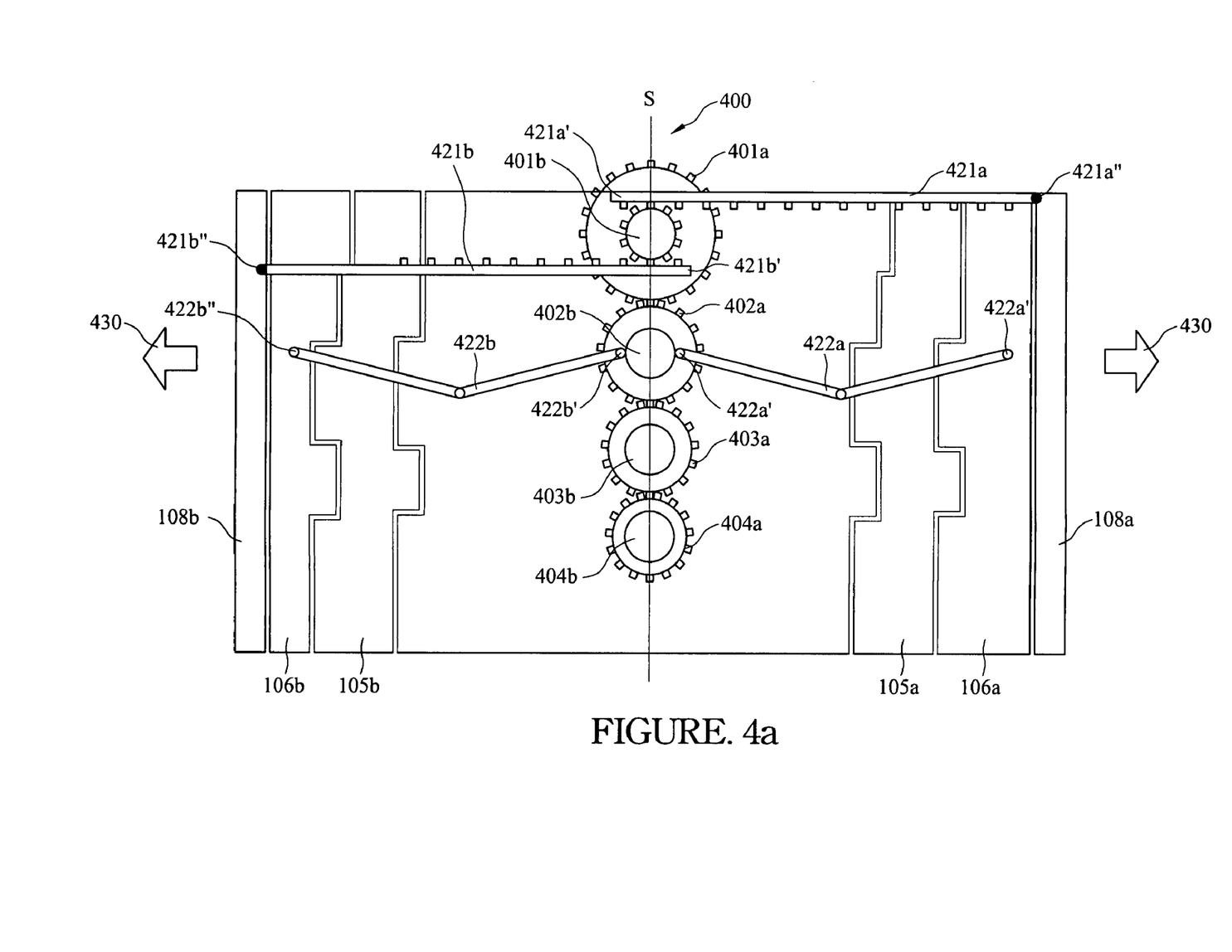
FIG. 4a illustrates the perspective view of a keyboard with closed key intervals, in accordance with the third preferred embodiment of present invention.
Figure 4B:
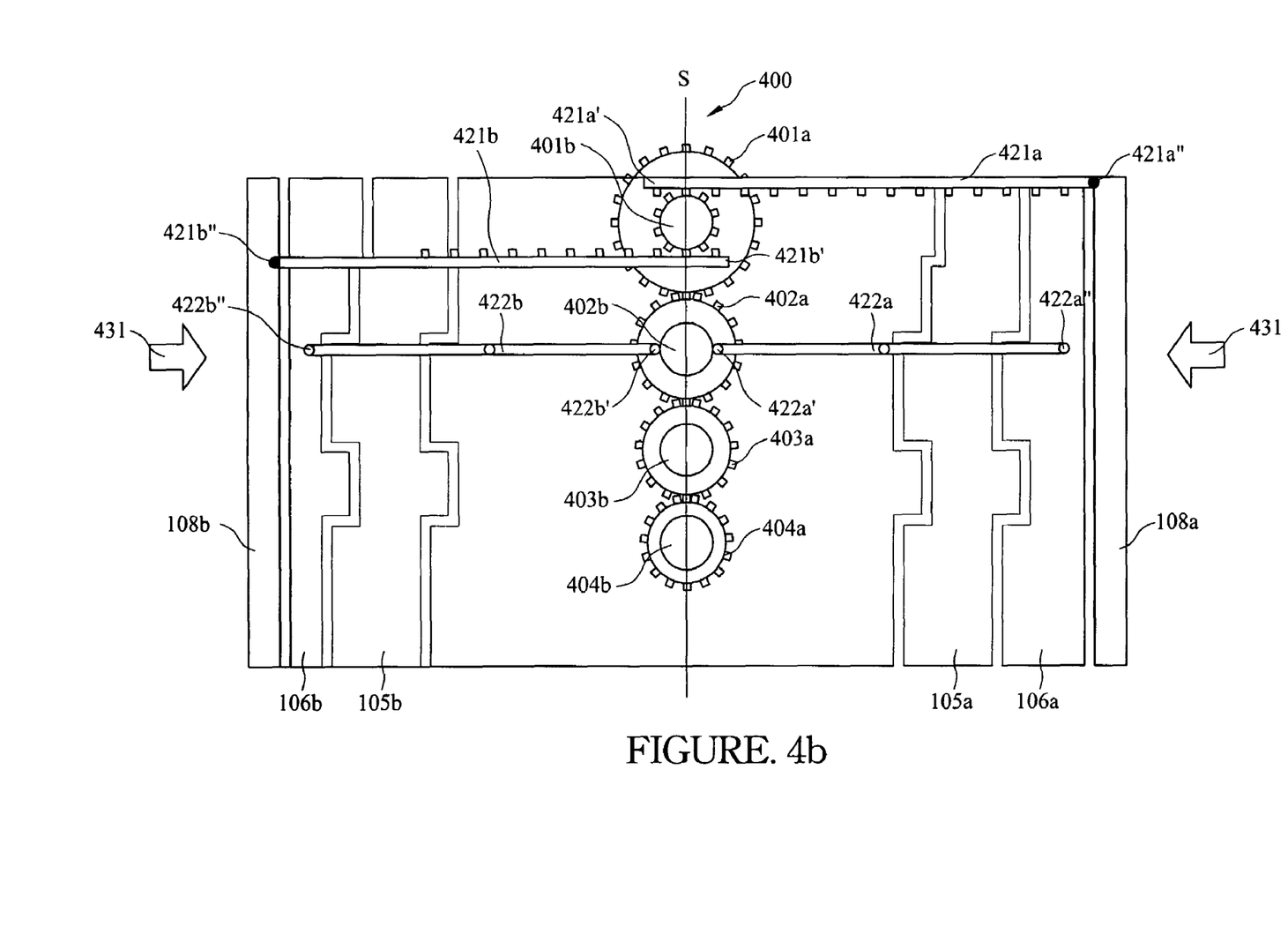
FIG. 4b illustrates the perspective view of a keyboard with open key intervals, in accordance with the third preferred embodiment of present invention.

FIG. 4a illustrates a perspective view of a keyboard with closed key intervals, in accordance with the third preferred embodiment of present invention. FIG. 4b illustrates a perspective view of a keyboard with separated key intervals, in accordance with the third preferred embodiment of present invention. The structures illustrated FIG. 4a and FIG. 4b are similar to the structures illustrated in FIG. 3a and FIG. 3b, but vary in the configurations of the differential mechanism and the migration controller.

Referring to FIG. 4a and FIG. 4b, the differential mechanism 400 comprises a plurality of differential gears and a plurality of corresponding migration controllers. Each of the migration controllers has at least one pair of symmetric control elements, and the differential gears may be integrated into a compensating gear train.

Each of the differential gears fixed on the centerline S of the baseboard 100 comprises a differential gearwheel, such as 401a, 402a, 403a, or 404a or and a corresponding driver wheel. Each of the differential gearwheels and the corresponding driver wheel connect with each other coaxially, and each of the differential gearwheels and the corresponding driver wheel may be driven by each other. In the preferred embodiment of the present invention the driver wheels is composed of a gearwheel 401b, and several driver cams, such as 402b, 403b and 404b.

Each of the differential gearwheels has a rotation radius different from those of the others; for example the differential gearwheels 401a, 402a, 403a, and 404a have different rotation radii respectively and are arranged in descending rank along the centerline S of the baseboard 100. In contrast, the driver wheels, such as gearwheels 401b, the driver cams 402b, 403b and 404b have the same rotation radius. Since these differential gearwheels 401a, 402a, 403a, and 404a have different rotation radii, the rotating numbers of each of differential gearwheels 401a, 402a, 403a, and 404a vary accordingly. When the driver gearwheels 401b, driver cams 402b, 403b and 404b are driven by the differential gearwheels, the driver gearwheels 401b, the driver cams 402b, 403b and 404b also have different rotating numbers, respectively.

Each pair of the symmetric control elements of the migration controllers has a lateral migration range different from those of the others. In the preferred embodiment of present invention, each pair of the symmetric control elements is composed of a pair of symmetric racks 421a, 421b and several pairs of symmetric connecting rods, such as 422a, 422b.

Each pair of the symmetric racks and each pair of the symmetric connecting rods have two pairs of symmetric ends, respectively. The pair of the symmetric ends adjacent to the diver wheels are fastened symmetrically on one of the corresponding driver gearwheel or the cams, and the other pair of symmetric ends departing from the driver wheel are fixed respectively on one pair of the key modules 101a, 101b, 102a, 102b, 103a, 103b, 104a, 104b, 105a, 105b, 106a, and 106b, or the pair of frame elements 108a and 108b. For example, the symmetric ends 421a' and 421b' of the pair of racks 421a and 421b are fastened on the driver gearwheel 401b, the other symmetric ends 421a" and 421b" of the pair of racks 421a and 421b departing from the driver gearwheel 401b are fixed on the pair of frame elements 108a and 108b, respectively.

The cooperation between the differential mechanism and key modules is described as follows. In the preferred embodiment, the symmetric ends 421a' and 421b' of the longest racks 421a and 421b are engaged symmetrically on the driver wheel (driver gearwheel 401b) connecting with the biggest differential gearwheel 401a, and the other symmetric ends 421a" and 421b" of the pair of racks 421a and 421b departing from the driver gearwheel 401b are respectively fixed on the pair of frame elements 108a and 108b that have the greatest distance from the centerline S of the baseboard 100. The symmetric ends 422a' and 422b' of the pair of connecting rods 422a and 422b with secondary length are engaged symmetrically on the driver wheel (the driver cam 402b) connecting with the second largest differential gearwheel 402a, and the other symmetric ends 422 a" and 422b" of the pair of connecting rods 422a and 422b departing from the driver cam 402b are respectively fixed on the pair of key module 106a and 106b that have the secondary distance from the centerline S of the baseboard 100. The symmetric ends of the shortest pair of connecting rods (not shown) are engaged symmetrically on the driver cam (not shown) connecting with the smallest gearwheel, and the other symmetric ends of the pair of connecting rod departing from the driver cam connecting with the smallest gearwheel are respectively fixed on the nearest pair of key module 101a and 101b from the centerline S of the baseboard 100.

Referring to FIG. 4a again, when one of the key modules or one the frame elements 108a or 108b is forced to depart from the centerline S of the baseboard 100 (shown as the arrow 430), the forced key module, for example 106a and 106b, drives the corresponding connecting rods 422a and 422b to propel all of the differential gearwheels, such as 401a, 402a, 403a, and 404a driver gearwheel 401b and driver cams, such as 402b, 403b, and 404b, such that the other migration controllers such as rack 321a and 321b and key modules 101a, 101b, 102a, 102b, 103a, 103b, 104a, 104b, 105a, 105b, and the pair of frame elements 108a and 108b are driven to depart from the centerline of the baseboard 100.

Referring to FIG. 4b again, when one of the key modules or one of the frame elements 108a or 108b is forced to move close up to the centerline S of the baseboard 100 (shown as the arrow 431), the forced key module, for example 106a and 106b, drives the corresponding connecting rods 422a and 422b to propel all of the differential gearwheels, such as 401a, 402a, 403a, and 404a driver gearwheel 401b and driver cams, such as 402b, 403b, and 404b, such that the other and key modules are driven to move close up to the centerline S of the baseboard 100.

According to the preferred embodiments aforementioned, the features of the present invention is to separate the keyboard into several key modules, which intervals may be extended to depart from the centerline of the keyboard by a differential mechanism in compliance with the principles of ergonomics. The extended keyboard may be closed up toward the centerline after operation for convenient transport. Therefore, the embodiments of present invention indeed can provide an electronic device an ergonomic keyboard with transport convenience for reaching the objective aforementioned.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A keyboard with intervals-adjustable keys, comprising:
a baseboard;
a plurality of key modules, symmetrically arranged on the baseboard, wherein each of the key modules has at least one key element fixed on a module base;
at least one piezoelectric device connecting with the key modules, wherein the at least one piezoelectric device generates an electrical signal when the key modules are touched; and
a differential mechanism comprising a plurality of differential gears and a plurality of migration controllers, wherein each of the differential gears and one of the migration controllers are engaged movably and driven by each other;
wherein each of the differential gears is fastened on the baseboard, and comprises at least one differential gearwheel and at least one corresponding driver wheel;
wherein the differential gears are integrated into a compensating gear train, and each of the migration controllers migrates a migration range and contacts with one of the pairs of the key modules and one of the differential gears to drive the key modules to move.

2. The keyboard with intervals-adjustable keys according to claim 1, wherein each of the migration controllers comprises even numbers of symmetric control elements, wherein each pair of the symmetric control elements has two pairs of symmetric ends, and wherein a pair of the symmetric ends is fixed on one of the differential gears symmetrically, while another pair of the symmetric ends is fixed on one of the pairs of the key modules, symmetrically.

3. The keyboard with intervals-adjustable keys according to claim 2, wherein each of the symmetric control elements is selected from a group consisting of a rack, a wire, a connecting rod and the any arbitrary combination thereof.

4. The keyboard with intervals-adjustable keys according to claim 2, wherein the migration range of each pair of the symmetric control elements is different from the migration ranges of other pairs of the symmetric control elements.

5. The keyboard with intervals-adjustable keys according to claim 1, wherein when one of the key modules is forced to depart from each other, the forced key module drives the corresponding migration controller to propel all the differential gears, whereby other migration controllers are pushed to drive others of the key modules to depart from each other.

6. The keyboard with intervals-adjustable keys according to claim 1, wherein when one of the key modules is forced to move to approach each other, the forced key module drives the corresponding migration controller to propel all the differential gears, whereby the other migration controllers are pushed to drive others of the key modules to approach each other.

7. The keyboard with intervals-adjustable keys according to claim 1, further comprising a pair of frame elements arranged symmetrically on the baseboard, and located on the outside of the key modules.

8. The keyboard with intervals-adjustable keys according to claim 7, further comprising a scale device used to maintain specific intervals between the key modules during operation, wherein the scale device comprises a scale element fixed on the baseboard and a corresponding engaging element configured on one of the frame elements.

9. The keyboard with intervals-adjustable keys according to claim 8, wherein the scale element comprises a plurality of predetermined scale marks and a plurality of engaging recesses located on an edge of the scale element corresponding to the scale marks.

10. The keyboard with intervals-adjustable keys according to claim 9, wherein the engaging element is a flange protruding from the frame element used to engage with one of the engaging recesses to prevent the key modules from moving around during operation.

11. The keyboard with intervals-adjustable keys according to claim 1, wherein the module base is selected from a group consisting of a rigid metal substrate, a rigid nonmetal substrate, and the any arbitrary combination thereof.

12. The keyboard with intervals-adjustable keys according to claim 1, wherein the piezoelectric devices comprises at least one flexible printed circuit.

13. The keyboard with intervals-adjustable keys according to claim 1, wherein each of the differential gearwheels and corresponding driver wheel connect to each other coaxially, and each of the differential gearwheels and corresponding driver wheel are driven by each other.

14. The keyboard with intervals-adjustable keys according to claim 1, wherein each of the differential gearwheels has a different rotation radius, respectively.

15. The keyboard with intervals-adjustable keys according to claim 1, wherein each of the driver wheels has an identical rotation radius.

16. The keyboard with intervals-adjustable buttons according to claim 1, wherein each of the driver wheels may be selected from a group consisting of a gearwheel, a roller, a cam and the any arbitrary combination thereof.

17. The keyboard with intervals-adjustable keys according to claim 1, wherein each of the migration controllers is arranged according to a descending rank of the migration ranges thereof to match a pair of corresponding key modules arranged according to a descending rank of distances from the centerline of the baseboard.

* * * * *